United States Patent
DePaso et al.

(10) Patent No.: US 9,815,632 B2
(45) Date of Patent: Nov. 14, 2017

(54) LOW-ENERGY ROLLER-BELT ACCUMULATOR

(71) Applicant: Laitram, L.L.C., Harahan, LA (US)

(72) Inventors: Joseph M. DePaso, River Ridge, LA (US); John S. Reid, III, Woodstock, GA (US); Paul Neuschwander, High Ridge, MO (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/113,528

(22) PCT Filed: Feb. 4, 2015

(86) PCT No.: PCT/US2015/014349
§ 371 (c)(1),
(2) Date: Jul. 22, 2016

(87) PCT Pub. No.: WO2015/126619
PCT Pub. Date: Aug. 27, 2015

(65) Prior Publication Data
US 2017/0043959 A1    Feb. 16, 2017

Related U.S. Application Data

(60) Provisional application No. 62/035,144, filed on Aug. 8, 2014, provisional application No. 61/941,876, filed on Feb. 19, 2014.

(51) Int. Cl.
*B65G 23/32* (2006.01)
*B65G 47/26* (2006.01)
*B65G 17/24* (2006.01)
*B65G 37/00* (2006.01)
*B65G 39/20* (2006.01)
(Continued)

(52) U.S. Cl.
CPC ............ *B65G 23/32* (2013.01); *B65G 17/24* (2013.01); *B65G 37/00* (2013.01); *B65G 39/20* (2013.01); *B65G 43/00* (2013.01); *B65G 43/08* (2013.01); *B65G 47/261* (2013.01); *B65G 47/268* (2013.01)

(58) Field of Classification Search
CPC ...... B65G 17/24; B65G 47/268; B65G 47/29; B65G 23/32; B65G 47/261
See application file for complete search history.

(56) References Cited

U.S. PATENT DOCUMENTS 5,285,887 A * 2/1994 Hall ................. B65G 43/10
198/460.1
6,523,672 B2 * 2/2003 Greve ................ B65G 17/065
198/459.8

(Continued)

*Primary Examiner* — Thomas Randazzo
(74) *Attorney, Agent, or Firm* — James T. Cronvich

(57) ABSTRACT

A conveyor system and method for cascaded accumulation on a series of in-line roller belts. An accumulation system comprises a series of roller belts that can be actuated in contiguous zones to accelerate conveyed articles forward at twice the belt speed. When articles start to accumulate on the accumulation conveyor, the belt rollers are deactuated downstream to upstream zone by zone. Then the belts are stopped as they fill with accumulated articles. The process is repeated in cascade for the upstream roller belts as articles continue to accumulate.

22 Claims, 6 Drawing Sheets

(51) Int. Cl.
 *B65G 43/00* (2006.01)
 *B65G 43/08* (2006.01)

(56) References Cited

U.S. PATENT DOCUMENTS

| | | | | |
|---|---|---|---|---|
| 6,811,018 | B2 * | 11/2004 | Cotter | B65G 15/22 198/460.1 |
| 7,040,480 | B2 * | 5/2006 | Sedlacek | B65G 17/24 198/457.02 |
| 7,249,671 | B2 * | 7/2007 | Riddick | B65G 17/24 198/411 |
| 8,167,119 | B2 | 5/2012 | Wargo et al. | |
| 8,342,313 | B2 * | 1/2013 | Wargo | B65G 47/29 198/419.1 |
| 8,978,880 | B2 | 3/2015 | Heinemeier | |
| 9,010,523 | B2 | 4/2015 | Fourney | |
| 9,037,290 | B2 | 5/2015 | Neiser et al. | |
| 9,073,694 | B2 | 7/2015 | Ozaki | |
| 9,199,799 | B2 | 12/2015 | Neiser et al. | |
| 9,199,802 | B2 | 12/2015 | Neiser et al. | |
| 2007/0119690 | A1 * | 5/2007 | Lupton | B65G 47/261 198/781.06 |
| 2008/0121498 | A1 * | 5/2008 | Costanzo | B65G 17/24 198/779 |
| 2015/0151921 | A1 | 6/2015 | Collot | |

\* cited by examiner

LOW-ENERGY ROLLER-BELT ACCUMULATOR

BACKGROUND

The invention relates generally to power-driven conveyors and more particularly to accumulators comprising a series of in-line roller belts.

Roller belts with in-line rollers, i.e., rollers mounted on axles or hinge rods forming axes of rotation perpendicular to the direction of belt travel, are used to allow blocked articles, such as boxes or packages, to accumulate atop the rollers as the roller belt continues to advance. The rollers rotate freely about their axes of rotation as they advance with the belt under the accumulating articles. Because of the rolling contact with the bottoms of the articles, the articles accumulate on the belt with low back line pressure. In many roller-belt conveyors, the belt rollers can be actuated, when not accumulating, by contact with a roller-actuating surface in the belt's carryway. When actuated, the belt rollers propel articles atop the actuated rollers forward along the advancing belt. With the rollers actuated, the belt is in low-friction rolling contact with the carryway. But when the rollers are deactuated to rotate freely during accumulation, the belt is supported in sliding contact with the carryway. Because sliding friction is much greater than rolling friction, the belt's drive motor has to be sized considerably larger to accommodate a fully loaded and deactuated roller belt.

SUMMARY

One version of a conveyor system embodying features of the invention comprises an accumulation system extending in length from an upstream end to a downstream end in a conveying direction. The accumulation system includes one or more roller belts arranged along the length of the accumulation conveyor. Each of the roller belts includes a plurality of article-supporting rollers that support articles to be conveyed atop the roller belts in the conveying direction. Roller-actuating mechanisms are arranged along the length of the accumulation system to selectively actuate and deactuate the article-supporting rollers in accumulation zones that extend from the upstream end of the accumulation system to the downstream end. When actuated, the article-supporting rollers rotate to propel articles in the conveying direction as the roller belt advances. When deactuated, the rollers are freely rotatable. A controller coupled to the roller-actuating mechanisms and the roller belts deactuates the article-supporting rollers zone by zone in order opposite to the conveying direction from the accumulation zone at the downstream end to the accumulation zone at the upstream end as articles accumulate on the accumulation system.

Another version of a conveyor system embodying features of the invention comprises an accumulation system extending in a conveying direction from an upstream end to a downstream end. The accumulation system comprises a plurality of roller-belt conveyors arranged in series between the upstream end and the downstream end. Each of the roller-belt conveyors includes a roller belt having a top and a bottom and article-supporting rollers extending past the top and the bottom. One or more accumulation zones are disposed along the length of the roller belt. Each of the accumulation zones includes one or more roller-actuating mechanisms, each of which includes a roller carryway and a belt carryway selectively positionable from an actuating position to a deactuating position. In the actuating position, the belt carryway is out of contact with the roller belt, and the roller carryway is in contact with the article-supporting rollers from below to provide a support surface on which the article-supporting rollers can ride and support the roller belt. The roller carryway in contact with the article-supporting rollers actuates the rollers to rotate to propel articles atop them forward along the roller belt advancing past the roller-actuating mechanism in the conveying direction. In the deactuating position, the roller carryway is out of contact with the article-supporting rollers to deactuate the article-supporting rollers so that they can rotate freely, and the belt carryway is in contact with the bottom of the roller belt to provide a slide surface for the roller belt when it advances in the conveying direction. One or motors selectively stop and advance the roller belts in the conveying direction. One or more sensors are arranged to detect the accumulation of stopped articles at one or more positions along the roller-belt conveyors. A controller coupled to the one or more sensors, the one or more motors, and the one or more roller-actuating mechanisms controls the actuation of the rollers zone by zone and the running of the roller belts belt by belt.

In another aspect of the invention, a method for accumulating articles on an accumulation system comprising one or more roller belts advanceable in a conveying direction through a series of accumulation zones from an upstream end to a downstream end comprises: (a) selectively advancing one or more roller belts in a conveying direction through a series of accumulation zones; (b) selectively actuating article-supporting rollers supporting articles atop the one or more roller belts in a series of roller-actuation segments along the length of an accumulation system between an upstream end and a downstream end by contacting the article-supporting rollers from below with a roller carryway in each of the roller-actuation segments to cause the article-supporting rollers to rotate to propel the articles forward on the roller belts in the conveying direction; (c) supporting the actuated article-supporting rollers and the one or more roller belts in rolling contact with the roller carryway in the actuated roller-actuation segments; (d) selectively deactuating the article-supporting rollers in a roller-actuation segment by supporting the bottoms of the one or more roller belts in contact with a belt carryway so that the roller carryway is out of contact with the article-supporting rollers in the roller-actuation segment so that the deactuated article-supporting rollers are freely rotatable to provide low backline pressure to articles accumulated atop the rollers in the deactuated roller-actuation segment; and (e) stopping a roller belt from advancing in the conveying direction when the article-supporting rollers in one or more of the roller-actuation segments encompassing the roller belt are deactuated.

In another aspect of the invention, a roller belt comprises first and second rollers arranged in longitudinal first and second lanes that extend along the length of the belt. The lanes are spaced apart laterally across the width of the belt. The first lanes alternate with the second lanes laterally across the width of the roller belt. The second rollers extend below the bottom surface of the belt a lesser distance than the first rollers.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
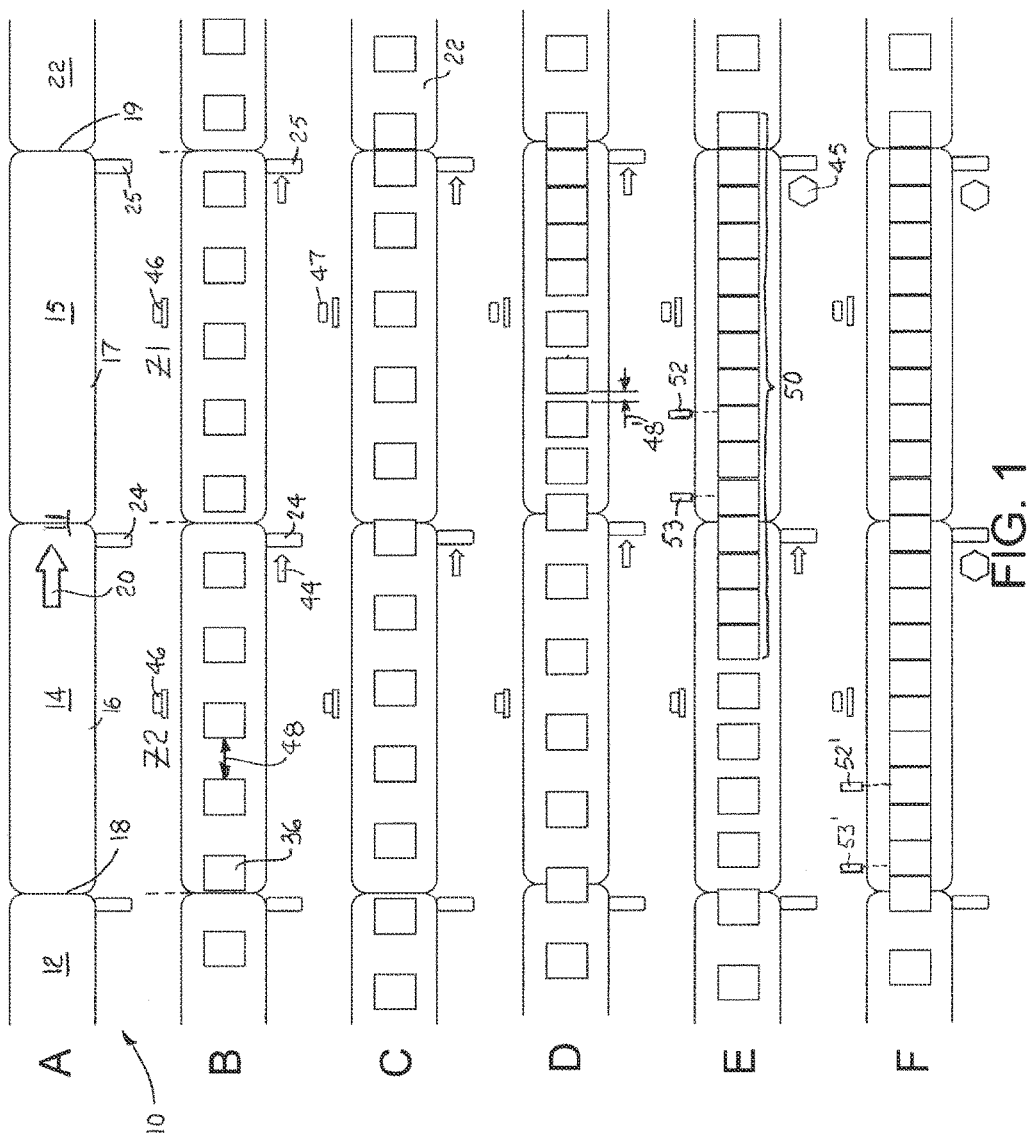
FIG. 1 is a top plan view of one version of a conveyor system embodying features of the invention shown in a sequence of operating states.

A conveyor system embodying features of the invention is shown in FIG. 1. The conveyor system 10 is shown not running in line A. Lines B-F depict the conveyor system in a sequence of states. The conveyor system comprises an infeed conveyor 12 feeding an accumulation system 11. The accumulation system 11 includes two accumulation conveyors 14, 15, each having an associated roller belt 16, 17. The roller belts 16, 17 are arranged end to end in series. The accumulation system 11 could include more than two accumulation conveyors 14, 15 or even be made with a single accumulation conveyor, but is shown with two in the drawings as an example. The accumulation system 11 extends from an upstream end 18 at the exit of the infeed conveyor 12 in a conveying direction 20 to a downstream end 19 at an exit conveyor 22. The roller belts 16, 17 are driven in the conveying direction 20 by motors 24, 25.

Figure 2:
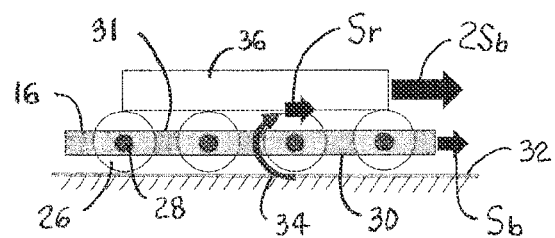
FIG. 2 is a side view of a portion of a roller belt as in the conveyor system of FIG. 1 showing the article-acceleration effect of an actuated belt roller.

A portion of one of the roller belts 16, 17 is shown from the side in FIG. 2. Examples of such roller belts are the INTRALOX® Series 400 0° Angled Roller belt and the Series 900 Flush Grid belt with insert rollers manufactured and sold by Intralox, L.L.C., of Harahan, La., U.S.A. The belt 16 is shown advancing along a carryway in the conveying direction at a belt speed $S_b$. Article-supporting belt rollers 26 are mounted on axles or hinge rods 28 so that the rollers rotate on axes parallel to the width direction of the belt and perpendicular to the conveying direction. Rollers arranged to rotate on axes perpendicular to the conveying direction are referred to as in-line rollers. And, when a roller is said to rotate in a certain direction, it means that the top of the roller has a tangential velocity in that direction. So in-line rollers can rotate in or opposite to the conveying direction. The rollers extend past the bottoms and tops 30, 31 of the belt 16 so that they can be actuated and support conveyed articles. The rollers 26 are shown rolling on a roller carryway that provides a support surface 32 to the rollers when actuated. As the belt 16 advances along the carryway at the speed $S_b$, contact between the rollers 26 and the support surface 32 causes the rollers to rotate forward in the direction of arrow 34. The tangential velocity of the rollers 26 at their tops is directed in the conveying direction at a roller speed $S_r$. If there is no slip between the rollers 26 and the carryway surface 32, $S_r$ will equal $S_b$. An article 36 atop the actuated rollers 26 is propelled forward in the conveying direction at an absolute speed, i.e., the article speed as viewed by a stationary observer, of $S_r+S_b=2S_b$ (twice the belt speed). Because some slip is common in practice, the article speed is typically less than $2S_b$.

Figure 3:
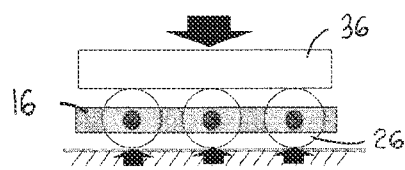
FIG. 3 is a side view of a portion of a roller belt as in the conveyor system of FIG. 1 showing the low-energy effect of an actuated roller.

The actuated rollers 26 also provide another benefit besides article acceleration. As shown in FIG. 3, the weight of a conveyed article 36 is borne entirely by the rollers 26 on which the article bears and not by the belt 16 itself. So a belt having less pull strength than one not riding on rollers and a smaller-size motor reducing energy consumption can be used.

Figure 4A:
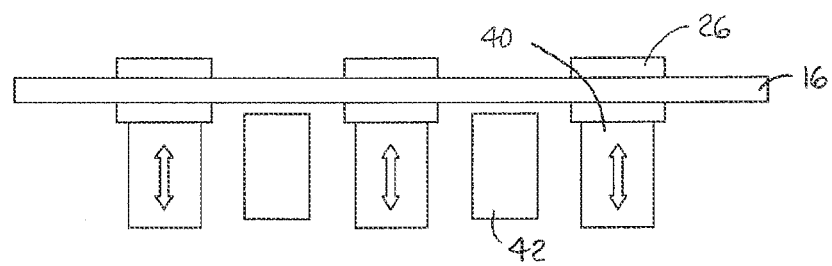
FIGS. 4A and 4B are front elevation views of the roller belt as in the conveyor system of FIG. 1 showing the rollers actuated and deactuated.
Figure 4B:
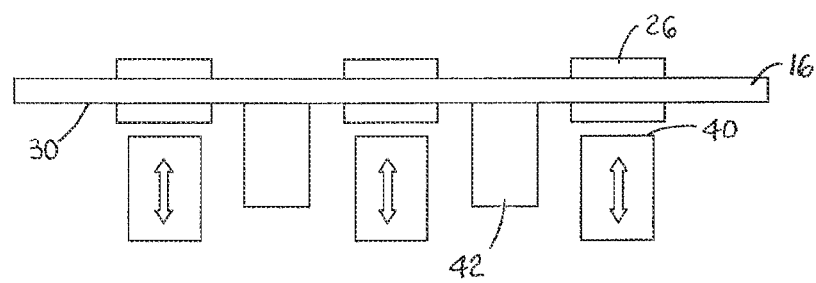

FIG. 4A shows the roller belt 16 with the article-supporting roller 26 actuated by contact with the upper surface of a roller carryway 40. The roller carryway 40 in this example moves between a raised actuating position in FIG. 4A and a lowered deactuating position in FIG. 4B. When the roller carryways are lowered out of contact with the rollers 26, the belt 16 is supported on static belt carryways 42, on which the bottom 30 of the belt slides as the belt advances. Together with a conventional actuating device, such as a pneumatic, hydraulic, or electromechanical actuator, the roller carryway and the belt carryway constitute a roller-actuating mechanism. Although the roller carryways 40 are shown as moving vertically into and out of contact with the rollers in FIGS. 4A and 4B, they could be moved laterally into and out of contact, as another example. Or the roller carryways 40 could be stationary and the belt carryways 42 moved vertically up into engagement with the bottom of the belt to lift the belt so that the rollers are slightly above the roller carryways 40 and moved down out of engagement with the bottom of the belt far enough for the belt rollers to be supported on the roller carryways. Thus, the roller-actuating mechanism selectively switches between support by the belt carryways 42 (rollers deactuated and freely rotatable) and support by the roller carryways 40 (rollers actuated to propel articles forward).

The operation of the conveyor system 10 of FIG. 1 is illustrated by the sequence of lines B-F. In this example, each roller belt 16, 17 is associated with a single accumulation zone Z1, Z2. Each accumulation zone Z1, Z2 includes one or more roller-actuating mechanisms arranged in series along the length of the zone. The length of each roller-actuating mechanism in the conveying direction defines a roller-actuation segment of the accumulation zone. The belt rollers are deactuated or actuated during their pass through a roller-actuation segment by the roller-actuating mechanism. In this example, the belt rollers along the length of each belt are all actuated or deactuated together. In line B of FIG. 1, the rollers in both roller belts 16, 17 are actuated by the roller-actuating mechanisms (not shown) underlying the belts, and both roller belts are run in the conveying direction 20. Arrow symbols 44 next to the motors 24, 25 indicate that the motors are running and the belts are advancing. All the roller-actuating mechanisms in one zone are operated together so that they actuate or deactuate all the rollers in their zone simultaneously. The roller-actuation symbol 46 indicates that the rollers are actuated in each belt 16, 17. The exemplary conveyor system of FIG. 1 has two accumulation zones Z1 and Z2, each coincident with the length of a corresponding belt 16, 17. Thus, the number of roller belts equals the number of accumulation zones in the accumulation system of FIG. 1. With both roller belts 16, 17 actuated and running, articles 36 fed onto the accumulation system 11 encompassing the accumulation conveyors 14, 15 and their associated roller belts 16, 17 are propelled and carried forward at an absolute speed of about twice the belt speed. If the infeed conveyor 12 feeds the articles single file onto the upstream roller belt 16, a gap 48 will form between consecutive articles on the actuated roller belt.

In line C of FIG. 1, the exit conveyor 22 is stopped, which causes articles 36 on the downstream roller belt 17 to stop as they contact stopped articles downstream. The exit conveyor may be a high-friction belt conveyor operating as a brake belt, or it may be outfitted with a gate to selectively block and unblock the articles. Because of the block downstream, the one or more roller-actuating mechanisms in accumulation zone Z1 deactuate the rollers in the downstream belt 17 as indicated by the deactuation symbol 47. As shown by the progression from line C to line D, articles on the downstream roller belts 17 in zone Z1 advance with the still-running belt at the same speed as the belt. This causes the gaps 48' between consecutive articles to close. The deactuated downstream roller belt 17 in zone Z1 slides along the belt carryway with freely rotatable rollers reducing line pressure against the accumulated articles.

In line E, the lengthening slug 50 of accumulated articles in accumulation zone Z1 causes a photo eye 52 or other sensor to detect the accumulation of articles at that position in the zone. When that condition occurs, the drive motor 25 for the roller belt 17 in zone Z1 is stopped as indicated by the stop symbol 45. The upstream roller belt 16 pushes articles onto the downstream roller belt 17 on the belt's freely rotatable deactuated rollers. When a sensor 53 detects the slug 50 at a position close to the upstream end of the downstream roller belt 17 in zone Z1, the upstream roller belt in accumulation zone Z2 is first deactuated with the motor 24 still advancing the belt to allow articles to accumulate. Then the motor is stopped to halt the belt in the upstream zone Z2 as shown in line F. Sensors 52', 53' are similarly situated in the upstream zone Z2. Thus, each roller belt in the series is first deactuated and then stopped as the accumulation slug lengthens upstream. The rollers in the upstream belt 16 can be deactuated at times other than simultaneously with the sensor's detection of the accumulation slug. For example, the deactuation can occur a predetermined time delay after the sensor detects the slug. Or the system may be operated open loop, in which the deactuation times are based on a priori knowledge of accumulation-system parameters and set according to a predetermined time schedule.

Figure 5:
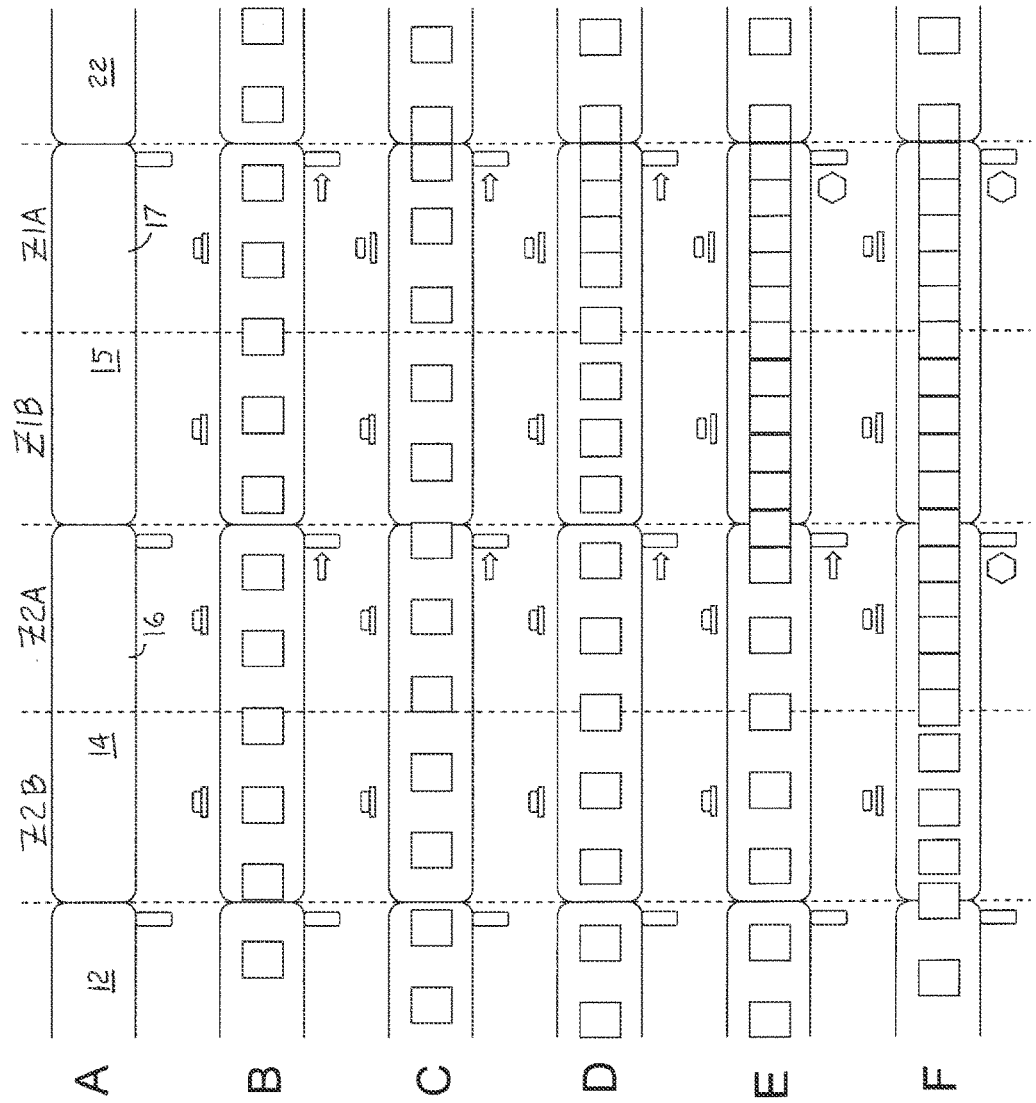
FIG. 5 is a top plan view of another version of a conveyor system embodying features of the invention including multiple accumulation zones in each roller-belt accumulation conveyor.

A similar scenario is depicted in FIG. 5. The difference is that each roller belt 16, 17 spans two accumulation zones, Z1A, Z1B, Z2A, Z2B. Each zone has one or more roller-actuating mechanisms, which may be independently controlled or controlled in one or more groups. The roller-deactuation-belt-stop sequence for the conveyor system of FIG. 1 [(a) downstream belt deactuate, (b) downstream belt stop, (c) upstream belt deactuate, (d) upstream belt stop] is changed to (a) downstream belt 17 downstream zone Z1A deactuate, (b) downstream belt 17 upstream zone Z1B deactuate, (c) downstream belt 17 stop, (d) upstream belt 16 downstream zone Z2A deactuate, (e) upstream belt upstream zone Z2B deactuate, (f) upstream belt 16 stop. If each roller belt were divided into more than two zones, the sequence would be to deactuate zones in sequence from downstream to upstream, stop the motor after all zones are deactuated, and repeat zone by zone and belt by belt downstream to upstream in cascade as the accumulation slug lengthens. By deactuating each belt zone by zone as in FIG. 5 rather than the entire belt at once as in FIG. 1, the benefits of running at least a portion of the belt in rolling contact with the carryway for longer periods can be reaped. This would allow smaller drive motors to be used to run the belts and reduce energy consumption.

When downstream processing stations demand accumulated articles, the controller stops accumulation by starting the exit conveyor, actuating the rollers, and running the roller belts. The rollers are actuated and the roller belts are run starting from the downstream end and working back upstream to form gaps between consecutive articles. The controller can actuate the rollers and run the roller belts upon detection of signals from the sensors and from knowledge of the system status in closed-loop operation or can actuate the rollers and run the roller belts according to a predetermined time schedule. If product spacing is unnecessary, all the roller belts can be run and their rollers actuated simultaneously.

Figure 6:
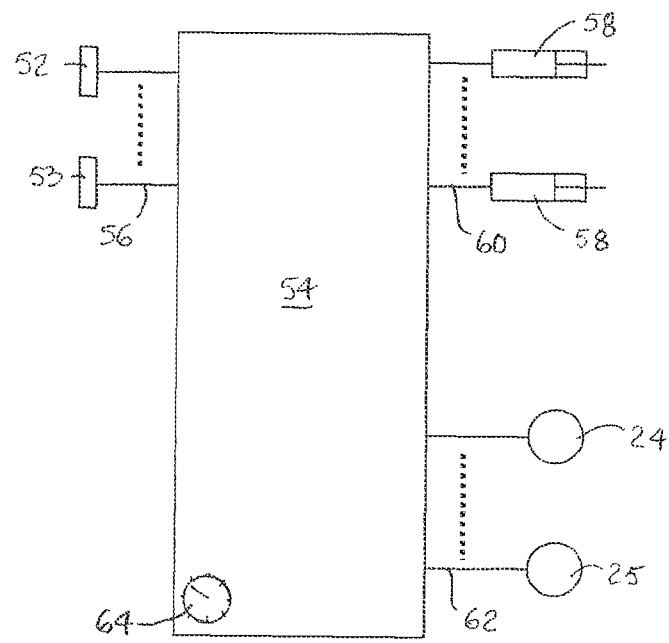
FIG. 6 is a block diagram of a control system for the conveyor systems of FIGS. 1 and 5.

A control system usable with the conveyor systems of FIGS. 1 and 5 is shown in FIG. 6. The control system includes a controller 54, such as a programmable logic controller or other programmable control device or discrete electronic or relay logic circuits. The sensors 52, 53 send sensor signals to the controller 54 over signal lines 56. From the sensor signals, the controller determines the state of the articles, such as gap length or a stopped belt. With knowledge of the states of the roller-actuating mechanisms 58 (actuating or deactuating) and the belt motors (stopped or running), the controller controls the roller-actuating mechanisms for each zone over actuator control lines 60 and the roller-belt motors 24, 25 over motor control lines 62. Optionally, the controller may use a timer 64 to trigger the sending of control signals to the motors or to the roller-actuating mechanisms to change their states. The timer may be set to time out a predetermined time after a predetermined sensor detects accumulated articles to interpose a delay between the reception of the sensor signal and the sending of a control signal to a motor or to a roller-actuating mechanism. Or the timer may be used to signal the controller to send control signals to the motors and the roller-actuating mechanisms according to a predefined scheduled sequence of actions.

Figure 7A:
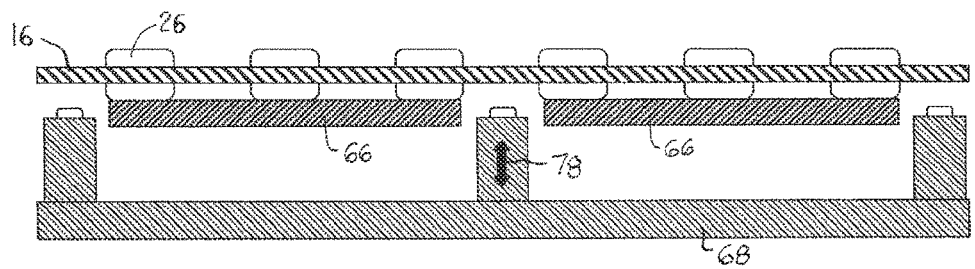
FIG. 7A is a cross sectional view of a conveyor system as in FIG. 1 in which the article supporting rollers ride on a stationary roller carryway in an actuated state.
Figure 7B:
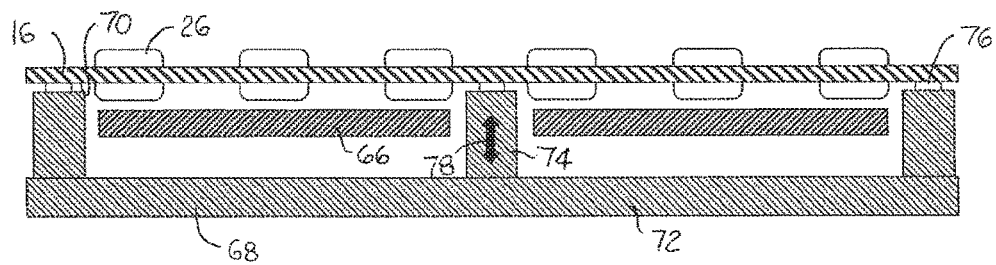
FIG. 7B is a cross sectional view in which wearstrips with carryway rollers are raised to elevate the belt rollers out of contact with the stationary wear pan in an actuated roller state.

Another version of a roller belt and roller-actuating mechanism usable in a conveyor system as in FIG. 1 or FIG. 5 is shown in FIGS. 7A and 7B. The belt 16 is a roller belt like that of FIG. 2 with embedded article-supporting rollers 26. When actuated as in FIG. 7A, the belt rollers 26 ride on stationary wear pans 66 forming a static roller carryway that is supported in the conveyor frame. The rollers 26 are deactuated, as shown in FIG. 7B, by raising a movable belt carryway 68 into contact with the bottom side 70 of the roller belt 16. The belt carryway 68 raises the belt 16 so that the belt rollers 26 are lifted out of contact with the static roller carryway 66 and deactuated for accumulation. In this example, the movable belt carryway 68 has a base 72 from which wear strips 74 extend upward. The strips can extend upward directly into contact with the bottom 70 of the belt in vacant lanes between the lanes of belt rollers 26 or can have lanes of support rollers 76 contacting the bottom 70 of the belt in low friction rolling, rather than sliding contact. In this example an actuator moves the belt carryway up and down as indicated by arrow 78.

Figure 8A:
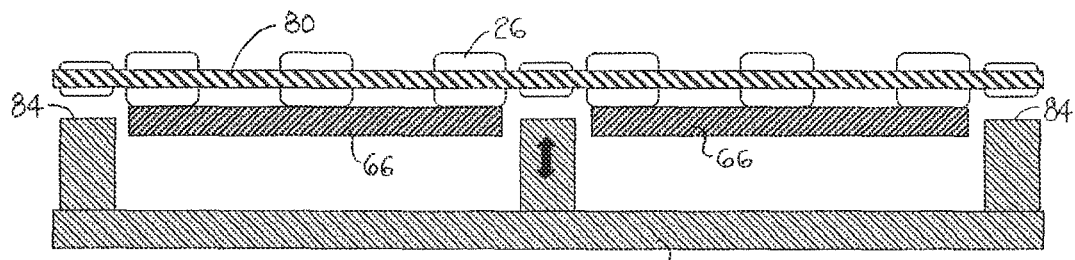
FIGS. 8A and 8B are cross sectional views of a conveyor system as in FIG. 1 with belt rollers actuated and deactuated and in which the conveyor belt has article-supporting rollers and smaller-diameter rollers.
Figure 8B:
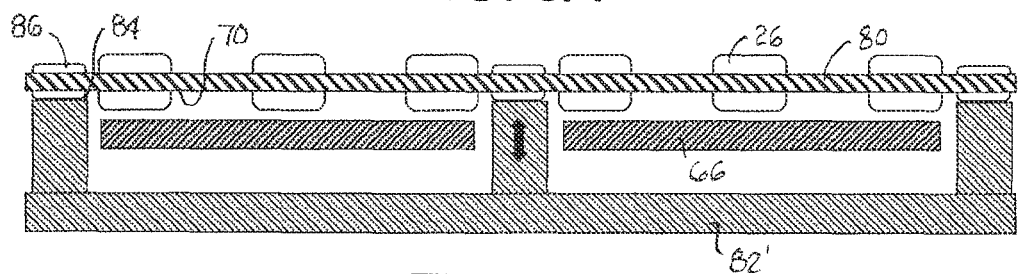
Figure 9:
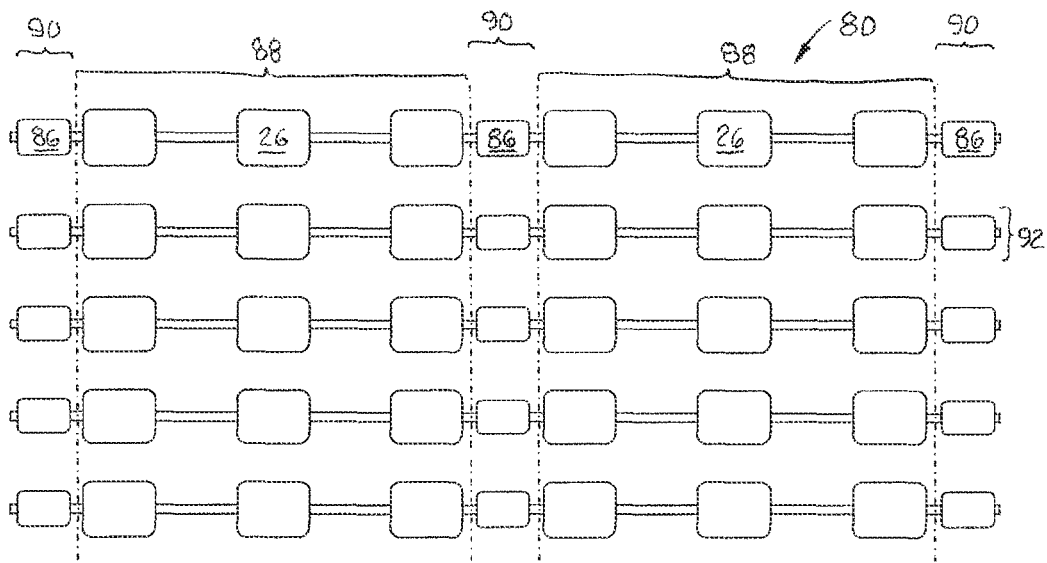
FIG. 9 is a top plan view of the conveyor belt of FIGS. 8A and 8B.

Another version of roller belt is shown in FIGS. 8A, 8B, and 9. The roller belt 80 is shown in FIGS. 8A and 8B with a static roller carryway 66 as in FIGS. 7A and 7B. The roller-actuating mechanism includes a movable belt carryway 82' that is retracted down so that the article-supporting belt rollers 26 are actuated as in FIG. 8A and that is extended up as in FIG. 8B to lift the belt 16 and move the belt rollers 26 out of contact with the roller carryway 66 to deactuate the rollers. In this example, the top faces of the belt carryway 82' contact lanes of small-diameter belt-support rollers 86 that extend below the bottom side 70 of the belt 80 a linear distance than the article-supporting rollers into low-friction rolling contact when the large, article-supporting rollers 26 are de-actuated. As shown in FIG. 9, the roller belt 80 has longitudinal lanes 88 of large rollers 26 alternating with longitudinal lanes 90 of small rollers 86. In this example the rollers, large and small, are arranged in lateral rows 92.

Figure 10:
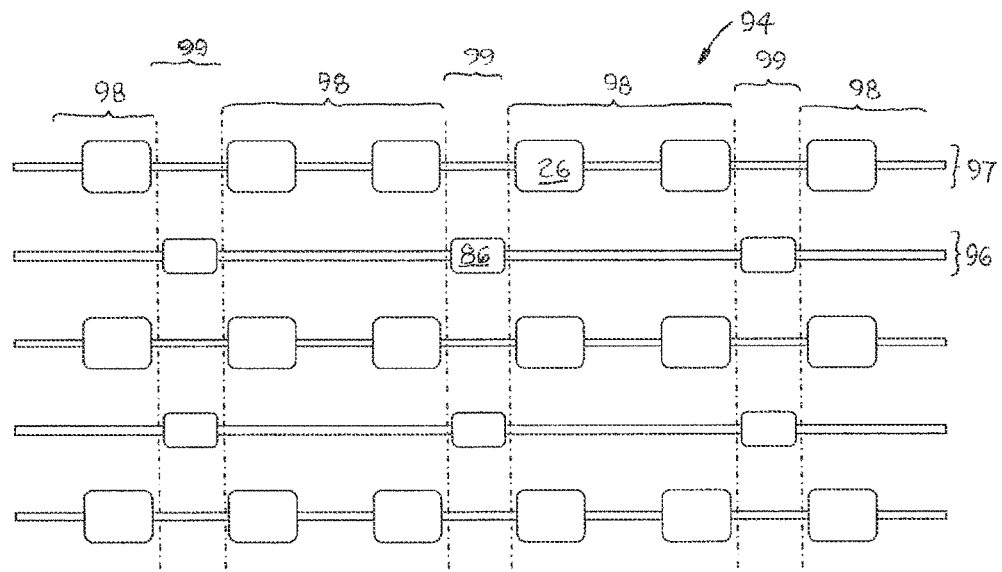
FIG. 10 is a top plan view of another version of a conveyor belt having rollers of two sizes as in FIG. 9, but with a different roller pattern.

In FIG. 10 another version of a roller belt usable with a roller-actuating mechanism similar to that of FIGS. 8A and 8B is shown. In this version the roller belt 94 has first rows 96 of small-diameter belt-support rollers 86 and second rows 97 of large-diameter, article-supporting rollers 26. The large-diameter rollers 26 are arranged in longitudinal lanes 98 that alternate across the width of the belt with longitudinal lanes 99 of the small-diameter, low-friction rollers 86. The geometry of the roller carryway and the belt carryway is adjusted from that shown in FIGS. 8A and 8B to accommodate the different roller-lane geometry of the belt 94.

Figure 11A:
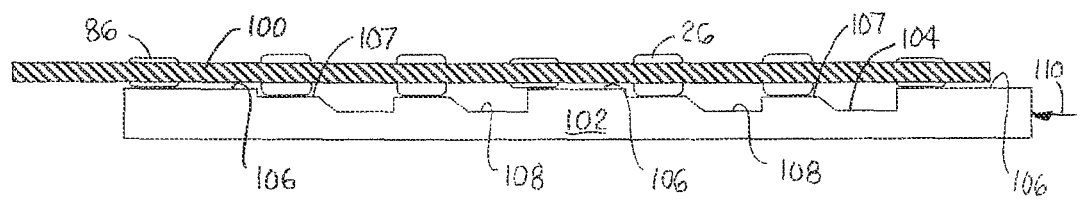
FIGS. 11A and 11B are cross sectional views of a conveyor belt similar to that of FIG. 9 actuated and deactuated by a mechanically programmed sliding carryway.
Figure 11B:
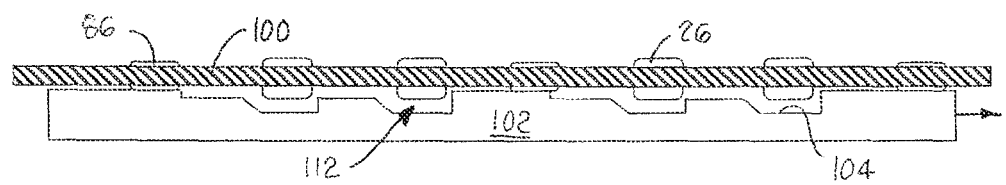

The roller belt 100 shown in FIGS. 11A and 11B has article-supporting rollers 26 actuated (in FIG. 11A) and deactuated (in FIG. 11B) by a roller-actuating mechanism that includes a sliding carryway 102. The sliding carryway 102 serves as a combined roller carryway—belt carryway. The roller belt 100 has large-diameter, article-supporting belt rollers 26 and small-diameter, low-friction belt-support rollers 86 in separate longitudinal lanes across the width of the belt. The sliding carryway 102 has a programmed, multi-level upper surface 104. In this example the upper surface 104 has three levels: (a) an uppermost level 106; (b) a lowermost level 108; and (c) an intermediate level 107. In FIG. 11A, the conveyor is shown with the large-diameter belt rollers 26 actuated in rolling contact with the intermediate level 107. The small-diameter, low-friction rollers 86 are in rolling contact with the uppermost level 106. The roller-actuating mechanism's actuation pushes the sliding carryway laterally, as indicated by arrow 110, into the roller deactuating position shown in FIG. 11B. In the deactuating position, the small-diameter rollers 86 are still in contact with the laterally elongated uppermost level 106. The article-supporting rollers 26 are shifted laterally to unsupported positions in the spaces 112 above the lowermost level 108. In this way the belt 100 advances along the carryway 102 in low-friction rolling contact with the article-supporting rollers 26 free to rotate for low backline-pressure accumulation. So, the sliding carryway 102 of the roller-actuating mechanism shifts laterally to actuate and deactuate the article-supporting belt rollers 26 as the roller belt 100 advances in low-friction, rolling contact with the carryway.

Although the invention has been described with reference to a few preferred versions, other versions are possible. For example, the distributed sensors could be replaced by a visioning system that views the entire conveyor system to determine the status of the conveyed articles. And the cascaded deactuation of the belt rollers can be extended to any number of consecutive roller belts and zones. Although the roller-actuating mechanisms have been described as arranged end to end in series, they could be separated by interposed permanently actuating roller-carryway segments or static belt-carryway segments providing no roller actuation. Instead of having rollers rotatable on fixed-direction axles, the roller belts could use spherical ball rollers not confined to a single axis of rotation. The conveyor systems have been shown conveying articles in single file, but are capable of conveying side-by-side articles. And the controllers could also use knowledge of or sensor readings of motor speed, motor current, or other conveyor system variables, settings, or parameters to determine the control actions to take. So, as these few examples suggest, the scope of the claims is not meant to be limited to the details of the exemplary versions.

What is claimed is:

1. A conveyor system comprising:
    an accumulation system extending in length from an upstream end to a downstream end in a conveying direction and including one or more roller belts arranged along the length of the accumulation system, wherein each of the one or more roller belts includes a plurality of article-supporting rollers supporting articles to be conveyed atop the roller belts in the conveying direction;
    a plurality of roller-actuating mechanisms arranged along the length of the accumulation system to selectively actuate and deactuate the article-supporting rollers in accumulation zones extending from the upstream end of the accumulation system to the downstream end, wherein actuated article-supporting rollers rotate to propel articles in the conveying direction as the roller belt advances and wherein deactuated article-supporting rollers are freely rotatable;
    a controller coupled to the roller-actuating mechanisms and the one or more roller belts to deactuate the article-supporting rollers zone by zone in order opposite to the conveying direction from the accumulation zone at the downstream end to the accumulation zone at the upstream end as articles accumulate on the accumulation system;
    wherein the accumulation system includes a plurality of roller belts arranged in series along the length of the accumulation system and wherein the controller stops an individual one of the roller belts from advancing in the conveying direction after the article-supporting rollers in one or more of the accumulation zones of the individual one of the roller belts are deactuated.

2. A conveyor system as in claim 1 wherein the controller stops the individual one of the roller belts when all the article-supporting rollers in the individual one of the roller belts are deactuated.

3. A conveyor system as in claim 1 further comprising a timer coupled to the controller and set to time out a predetermined time after a predetermined one of the roller-actuating mechanisms deactuates the article-supporting rollers in one of the accumulation zones and wherein the controller stops the individual one of the roller belts when the timer times out.

4. A conveyor as in claim 1 wherein each of the accumulation zones encompasses one or more roller-actuating mechanisms.

5. A conveyor system as in claim 1 wherein each of the plurality of roller-actuating mechanisms comprises a roller carryway and a belt carryway underlying one of the roller belts and actuates the article-supporting rollers by putting the roller carryway in contact with the article-supporting rollers and the belt carryway out of contact with the roller belt and deactuates the article-supporting rollers by putting the belt carryway in contact with the roller belt and the roller carryway out of contact with the article-supporting rollers, wherein the actuated article-supporting rollers roll on the roller carryway as the roller belt advances in the conveying direction to propel articles forward along the roller belt and wherein the deactuated article-supporting rollers are freely rotatable with the roller belt supported on the belt carryway.

6. A conveyor system as in claim 5 wherein one of the roller carryway and the belt carryway is stationary and the other of the roller carryway and the belt carryway moves to actuate and deactuate the article-supporting rollers.

7. A conveyor system as in claim 5 wherein the belt carryway includes carryway rollers to contact the roller belt when the article-supporting rollers are deactuated.

8. A conveyor system as in claim 5 wherein each of the one or more roller belts includes a plurality of belt-support rollers that extend a lesser distance below the one or more roller belts than the article-supporting rollers and wherein the belt-support rollers ride on the belt carryway when the article-supporting rollers are deactuated.

9. A conveyor system as in claim 1 wherein each of the one or more roller belts includes a plurality of belt-support rollers that extend a lesser distance below the one or more roller belts than the article-supporting rollers, wherein the belt-support rollers are arranged in longitudinal lanes that alternate across the width of the roller belt with longitudinal lanes of the article-supporting rollers, and wherein each of the plurality of roller-actuating mechanisms comprises a sliding carryway having a top surface with multiple levels arranged to actuate and deactuate the article-supporting rollers as the sliding carryway is shifted laterally from between an actuating position to a deactuating position.

10. A conveyor system as in claim 9 wherein the sliding carryway has an uppermost level, a lowermost level, and an intermediate level and wherein the belt-support rollers contact the uppermost level and wherein the article-supporting rollers contact the intermediate level when actuated and are separated across a space from the lowermost level when deactuated.

11. A conveyor system as in claim 1 wherein each of the plurality of roller-actuating mechanisms comprises a roller carryway underlying one of the roller belts and movable from an actuated position in contact with the article-supporting rollers to a deactuated position out of contact with the article-supporting rollers, wherein the article-supporting rollers roll on the roller carryway in the actuated position as the roller belt advances in the conveying direction and the rolling article-supporting rollers propel articles forward along the roller belt and wherein the roller carryway in the deactuated position is out of contact with the article-supporting rollers.

12. A conveyor system as in claim 11 wherein each of the plurality of roller-actuating mechanisms comprises a belt carryway wherein the belt carryway contacts the roller belt in sliding contact when the article-supporting rollers are deactuated and the roller belt is advancing in the conveying direction.

13. A conveyor system as in claim 1 further comprising one or more sensors arranged to detect accumulated articles at preselected positions along the length of the accumulation system and to send signals to the controller indicating accumulated articles at the preselected positions.

14. A conveyor system as in claim 13 further comprising a timer coupled to the controller and set to time out a predetermined time after a predetermined one of the one or more sensors detects accumulated articles at a preselected position along the length of the accumulation system and the controller stops an individual one of the roller belts when the timer times out.

15. A conveyor system as in claim 13 wherein the one or more sensors sense gaps between consecutive articles on the accumulation conveyor.

16. A conveyor system as in claim 1 wherein the number of accumulation zones equals the number of roller belts.

17. A conveyor system as in claim 1 wherein each of the roller belts spans more than one of the accumulation zones.

18. A conveyor system as in claim 1 further comprising an infeed conveyor positioned to feed articles in a single file onto the accumulation system at the upstream end of the accumulation conveyor.

19. A method for accumulating articles on an accumulation system comprising one or more roller belts advanceable in a conveying direction through a series of accumulation zones from an upstream end to a downstream end, the method comprising:
selectively advancing one or more roller belts in a conveying direction through a series of accumulation zones;
selectively actuating article-supporting rollers supporting articles atop the one or more roller belts in a series of roller-actuation segments along the length of an accumulation system between an upstream end and a downstream end by contacting the article-supporting rollers from below with a roller carryway in each of the roller-actuation segments to cause the rollers to rotate to propel the articles forward on the roller belts in the conveying direction;
supporting the actuated article-supporting rollers and the one or more roller belts in rolling contact with the roller carryway in the actuated roller-actuation segments;
selectively deactuating the article-supporting rollers in a roller-actuation segment by supporting the bottoms of the one or more roller belts in contact with a belt carryway so that the roller carryway is out of contact with the article-supporting rollers in the roller-actuation segment so that the deactuated article-supporting rollers are freely rotatable to provide low backline pressure to articles accumulated atop the rollers in the deactuated roller-actuation segment;
stopping a roller belt from advancing in the conveying direction when the article-supporting rollers in one or more of the roller-actuation segments encompassing the roller belt are deactuated;
supporting the bottoms of the one or more roller belts in sliding or rolling contact with the belt carryway in the deactuated roller-actuation zone.

20. The method of claim 19 wherein the roller belt is stopped when all the article-supporting rollers in the roller belt are deactuated.

21. The method of claim 19 further comprising:
setting a timer to time out a predetermined time after the article-supporting rollers in a predetermined one of the roller-actuation segments are deactuated; and
stopping the roller belt when the timer times out.

22. The method of claim 19 further comprising:
detecting accumulated articles at predetermined positions;
setting a timer to time out a predetermined time after accumulated articles are detected at one of the predetermined positions; and
stopping the roller belt when the timer times out.

* * * * *